(12) United States Patent
Khaira et al.

(10) Patent No.: US 9,729,960 B1
(45) Date of Patent: Aug. 8, 2017

(54) AUDIO LAYER IN KEYBOARD DEVICE PROVIDING ENHANCED AUDIO PERFORMANCE

(71) Applicant: Avnera Corporation, Beaverton, OR (US)

(72) Inventors: Manpreet Singh Khaira, Portland, OR (US); Thomas Irrgang, Portland, OR (US)

(73) Assignee: AVNERA CORPORATION, Beaverton, OR (US)

(*) Notice: Subject to any disclaimer, the term of this patent is extended or adjusted under 35 U.S.C. 154(b) by 175 days.

(21) Appl. No.: 14/297,480

(22) Filed: Jun. 5, 2014

Related U.S. Application Data

(63) Continuation-in-part of application No. PCT/US2012/069692, filed on Dec. 14, 2012, and a
(Continued)

(51) Int. Cl.
*H04R 1/20* (2006.01)
*H04R 1/28* (2006.01)

(52) U.S. Cl.
CPC .............. *H04R 1/20* (2013.01); *H04R 1/28* (2013.01)

(58) Field of Classification Search
CPC .... H04R 1/2819; H04R 1/2826; H04R 1/345; H04R 1/2803; H04R 1/026; H04R 3/005;
(Continued)

(56) References Cited

U.S. PATENT DOCUMENTS

| 5,668,882 A * | 9/1997 | Hickman | G06F 1/1616 |
| | | | 381/182 |
| 8,103,035 B2 * | 1/2012 | Parker | H04R 1/2857 |
| | | | 381/338 |

(Continued)

FOREIGN PATENT DOCUMENTS

| FR | 2770352 A1 | 4/1999 |
| WO | 2004/066673 A1 | 8/2004 |

(Continued)

OTHER PUBLICATIONS

Extended European Search Report, Dec. 14, 2015, 11 pages, EP Application No. 12866362.2, European Patent Office, Munich, Germany.
(Continued)

*Primary Examiner* — William A Jerez Lora
(74) *Attorney, Agent, or Firm* — Marger Johnson (57) ABSTRACT

An acoustic layer is added to a keyboard-type device including: enclosing walls, optionally—one or more microphones, a signal processing device, at least one audio transducer, and an acoustic waveguide. The acoustic layer adjoins one or more internal areas of a keyboard-type device. The signal processing device receives an internal signal from an electronic device either through wires or wirelessly. The signal processing device provides a directive sound enhancement of the audio input signals based on room acoustics, such as reverberation, echo, noise, delay, frequency response, and/or speaker-positional information that is determined by the signal processing device. The audio transducer device generates an audible audio output in response to an audio signal output from the signal processing device. The acoustic waveguide receives the audible audio output and generates an enhanced bass audio output from the acoustic waveguide.

12 Claims, 10 Drawing Sheets

Related U.S. Application Data continuation-in-part of application No. 13/419,222, filed on Mar. 13, 2012, now Pat. No. 9,204,211.

(60) Provisional application No. 61/831,531, filed on Jun. 5, 2013, provisional application No. 61/576,863, filed on Dec. 16, 2011.

(58) Field of Classification Search
CPC  H04R 29/00; H04R 2225/33; H04R 2400/03; H04R 2420/07
USPC ....... 381/337, 338, 339, 352, 160, 349, 350, 381/351, 302, 86, 389, 342; 181/148, 181/155, 196, 199, 156, 145, 296, 197
See application file for complete search history.

(56) References Cited

U.S. PATENT DOCUMENTS

| | | | |
|---|---|---|---|
| 2005/0100182 A1 | 5/2005 | Sykes et al. | |
| 2006/0165241 A1 | 7/2006 | Reid | |
| 2007/0217633 A1 | 9/2007 | Copeland et al. | |
| 2007/0268116 A1 | 11/2007 | Khoury | |
| 2008/0152181 A1 | 6/2008 | Parker et al. | |
| 2010/0093401 A1 | 4/2010 | Moran et al. | |
| 2010/0188212 A1* | 7/2010 | Jochelson | H04R 5/04 340/540 |
| 2011/0058677 A1 | 3/2011 | Choi et al. | |
| 2011/0127970 A1 | 6/2011 | Wang et al. | |
| 2011/0150259 A1* | 6/2011 | Parker | H04R 1/2857 381/345 |
| 2011/0255702 A1* | 10/2011 | Jensen | G01H 7/00 381/66 |
| 2012/0039475 A1 | 2/2012 | Berardi et al. | |
| 2012/0068832 A1* | 3/2012 | Feldstein | F16M 11/041 340/12.5 |
| 2012/0128165 A1 | 5/2012 | Visser et al. | |
| 2012/0162058 A1* | 6/2012 | Davis | G06F 3/1438 345/156 |
| 2012/0300382 A1* | 11/2012 | Huang | G06F 1/1679 361/679.17 |
| 2013/0058495 A1 | 3/2013 | Furst et al. | |

FOREIGN PATENT DOCUMENTS

| | | |
|---|---|---|
| WO | 2008/117908 A1 | 10/2008 |
| WO | 2011/139502 A1 | 11/2011 |

OTHER PUBLICATIONS

International Search Report, Jan. 15, 2015, 5 pages, International Application No. PCT/US2012/069692, Korean ntellectual Property Office, Republic of Korea.

Written Opinion of the International Searching Authority, Jan. 15, 2015, 8 pages, International Application No. PCT/US2012/069692, Korean Intellectual Property Office, Republic of Korea.

* cited by examiner

PRIOR ART

AUDIO LAYER IN KEYBOARD DEVICE PROVIDING ENHANCED AUDIO PERFORMANCE

CROSS-REFERENCE TO RELATED APPLICATION

This application claims the benefit of U.S. Provisional Patent Application No. 61/831,531 filed Jun. 5, 2013, the contents of which are hereby incorporated by reference. This application is also a continuation-in-part of and claims the benefit of priority to co-pending Patent Cooperation Treaty application number PCT/US2012/069692, filed Dec. 14, 2012 by Avnera Corporation, which in turn claims priority to U.S. Provisional Patent Application Ser. No. 61/576,863, filed Dec. 16, 2011. This application is also a continuation-in-part of and claims the benefit of priority to co-pending U.S. Non-Provisional patent application Ser. No. 13/419,222, filed Mar. 13, 2012, which in turn also claims priority to U.S. Provisional Patent Application Ser. No. 61/576,863; and this application also claims priority to U.S. Provisional Patent Application Ser. No. 61/806,786 filed Mar. 29, 2013; the entire contents of each of which are expressly incorporated in this application by this reference.

TECHNICAL FIELD

The invention relates generally to the field of computer keyboard-type devices. More particularly, the invention relates to the addition of a physical layer to the design of a keyboard device used in conjunction with a computer, TV, or anything that uses a keyboard input.

BACKGROUND

Most computers—especially desktop computers—are not designed with sound in mind. Most desktop computers include only a small speaker in the main electronics cabinet which is generally used to produce simple beep-type sounds as alerts to the user. A user wishing a better sound experience is generally directed towards purchasing a 2.1 computer audio system add-on. While these add-on sound systems often provide fairly-good sound capabilities, it does represent a significant expense and the addition of additional components to a computer installation. It is the intention of this disclosure to present the design of a wired or wireless keyboard that includes an acoustic layer built into the keyboard itself that will enhance the sound-producing abilities of a computer to the point that many users will be completely satisfied and avoid the need for a separate add-on sound system.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a keyboard that includes an acoustic layer to enhance the sound producing capabilities of the computer, such that additional audio enhancing peripheral components, or the like, may not be desired.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an audio layer in keyboard device. Although the present examples are described and illustrated herein as being implemented in a computer keyboard system, the system described is provided as an example and not a limitation. As those skilled in the art will appreciate, the present examples are suitable for application in a variety of different types of keyboard systems.

As used herein, the word "exemplary" means "serving as an example, instance, or illustration." Any embodiment described herein as "exemplary" is not to be construed as necessarily preferred or advantageous over other embodiments. Additionally, it will be appreciated that for simplicity and/or clarity of illustration, elements illustrated in the figures have not necessarily been drawn to scale. For example, the dimensions of some of the elements may be exaggerated relative to other elements for illustrative clarity. Further, in some figures only one or two of a plurality of similar elements indicated by reference characters for illustrative clarity of the figure, whereas all of the similar element may not be indicated by reference characters. Further still, it should be understood that although some portions of components and/or elements of the subject matter disclosed herein have been omitted from the figures for illustrative clarity, good engineering, construction and assembly practices are intended.

Figure 1:
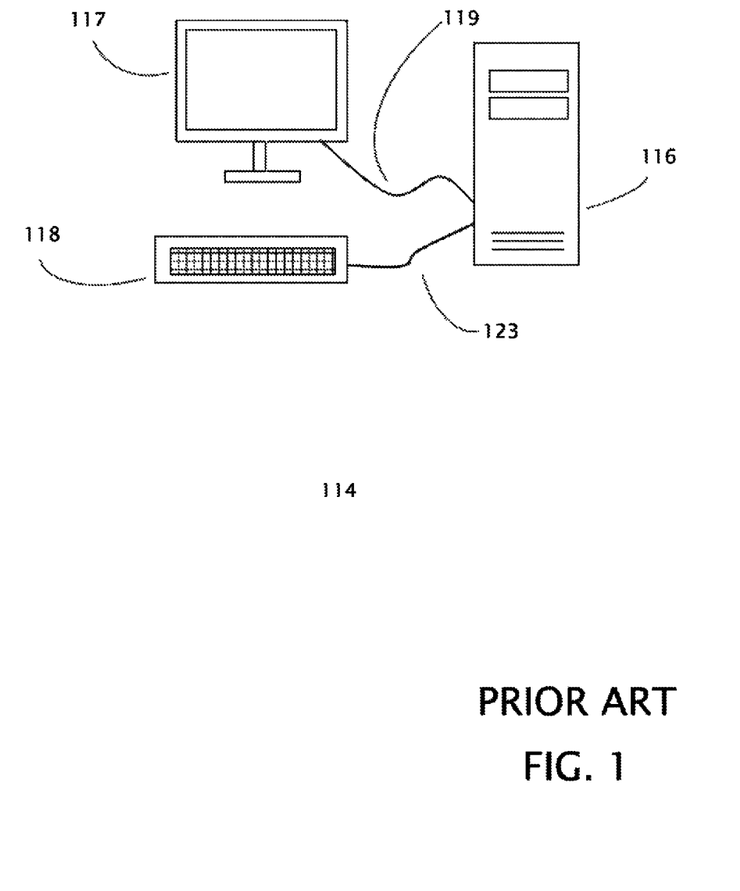
FIG. 1 is prior art and depicts a common computer installation including keyboard and an add-on 2.1 sound system.

FIG. 1 is prior art and depicts a common desktop computer installation, 114. This configuration includes a computer box, 116 that typically contains the power supply, CPU motherboard, optical drives, fans, etc. The computer box is connected by a video cable, 119, to the monitor, 117 and an additional cable, 123, to the keyboard, 118. The connection, 123, between the computer box and the keyboard might also be a wireless connection instead of being wired. A typical computer installation may also include a mouse (not shown.)

Figure 2:
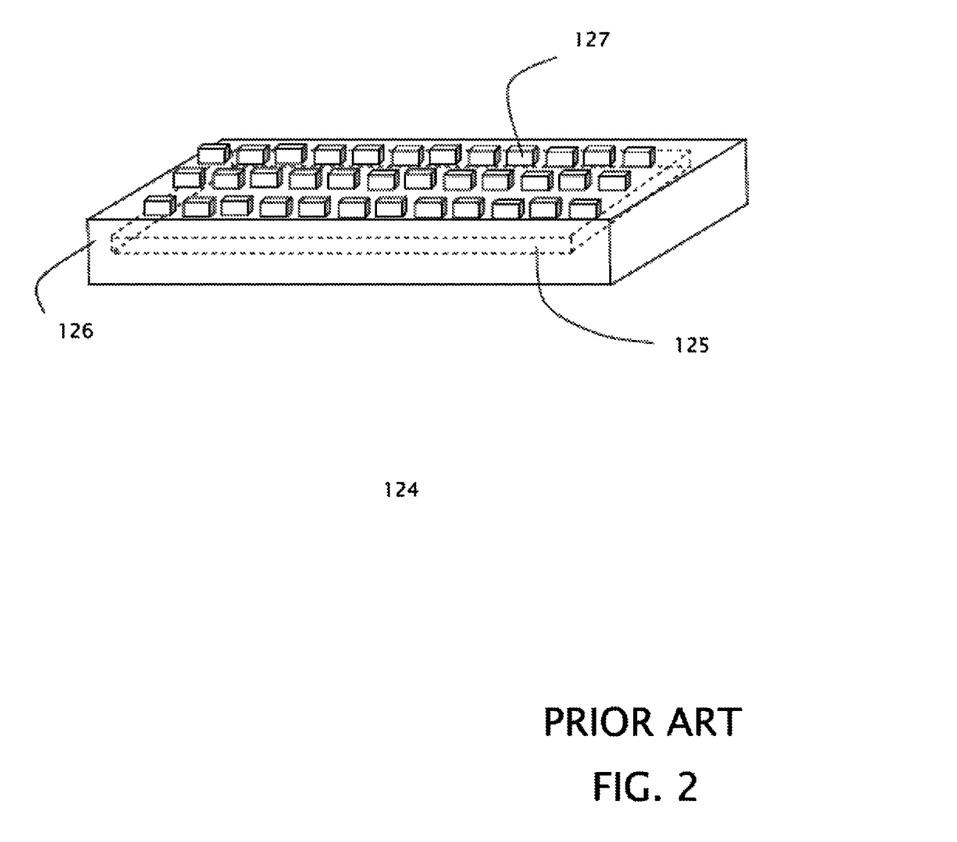
FIG. 2 is prior art and depicts a common computer keyboard including an electronics board with keypads exposed on the top (i.e. the keyboard layer), a top and a bottom case enclosure.

FIG. 2 is prior art and depicts a close up of the computer keyboard (item 118 in FIG. 1) This shows the typical construction of a keyboard—consisting of an enclosure, 126 that houses an electronics layer or assembly, 125, that may be included the keys, 127, of the keyboard that typically protrude through the top surface of the keyboard enclosure. In some "waterproof" keyboards, the top surface may include an outer skin or it's equivalent to provide that waterproof or dust proof feature. The electronics layer is coupled to or captured by the enclosure by conventional methods.

Figure 3:
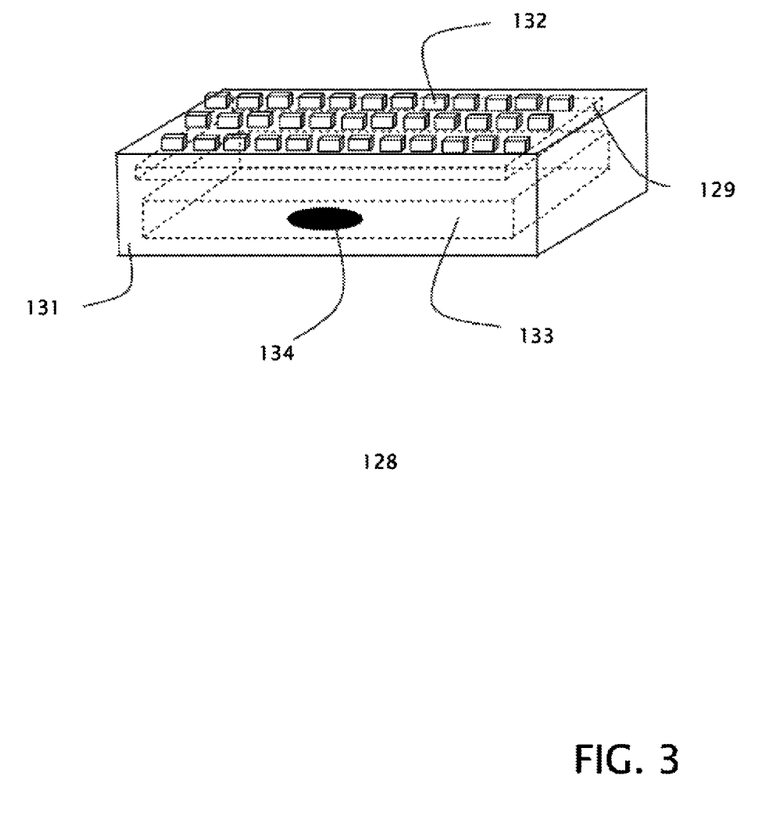
FIG. 3 depicts a keyboard including top keyboard layer to which an acoustic layer has been added according to the subject matter disclosed herein.

FIG. 3 depicts a keyboard including top keyboard layer to which an acoustic layer has been added which is the primary focus of this disclosure, which is a keyboard which adds an acoustic layer or assembly, 133 below the normal keyboard electronics, 129. The addition of this acoustic layer may greatly-enhance the sound-producing abilities of the keyboard which previously has, typically at best, included only limited sound-producing capability—often limited to piezoelectric beeps and clicks.

While the electronics layer, 129 typically does not form an air-tight seal between it and the enclosure 131, the acoustic layer, 133 will typically form a substantially air-tight acoustic cavity inside the enclosure. Typically the only opening in the acoustic layer will be the acoustic port, 134—shown here as a single opening in the front, though it could consist of more than one opening and could also be moved to the one of the other sides of the enclosure. The acoustic port is the exit path for the back-wave of the speakers that will be part of the acoustic layer. It is typically best to have the front wave of the speakers exiting the enclosure from the top or front surface of the keyboard, 128 while the acoustic port is part of an acoustic layer which is intentionally designed to enhance the bass response of the acoustic layer. Also shown are the keyboard buttons, 132 on the top and the cable, 806 connecting the keyboard to the computer box or chassis. Since the keyboard now contains an audio amplifier that will use a considerable amount of power, the connection, 132 to the computer box may carry the audio signal (which is typically digital, but could be analog) to be played by the acoustically-enhanced keyboard, 128 as well as the power required by the audio amplifier, in addition to the usual data traffic between the keyboard and the computer. If the connection between the acoustically-enhanced keyboard and the computer box is wireless, then the acoustically-enhanced keyboard may contain a battery to power the electronic enhancements of the acoustic layer.

The performance improvements that the inclusion of an intentional acoustic layer brings to the functions of a keyboard computer are many. They include audio power output, waveguide acoustic design to greatly enhance the bass response, advanced DSP functions such as equalization, increased LEFT/RIGHT channel separation, bass-enhancement algorithms, dynamic range algorithms (such as compression) and advanced support for speakerphone operation including such capabilities as spatial rendering of the physical location of various speakers in the room and de-reverberation of room acoustics. Some of these capabilities may be greatly improved through the inclusion of two microphones in the design.

While the capabilities of the acoustic layer are described as including speaker drivers, power supplies, audio amplifiers, DSP, microphones, back-wave speaker ports, front-wave speaker ports, acoustic waveguide structure and various interconnect, it is not necessary that all of these constituents are physically located inside the confines of that acoustic layer. Some of these components may get integrated into other layers, or sub assemblies (e.g. the electronics-layer or the enclosure) since in may be more economical to do so, or there may be improved performance in some aspect by doing so. The inclusion of these acoustic-layer features to a normal keyboard tends to improve the usefulness and value of a computer keyboard. Examples of stand-alone keyboards—such as a wireless keyboard for a tablet computer or iPad—are types of keyboards where inclusion of this invention world typically be desirable.

Acoustic layer 133 provides a robust stereo audio output with an enhanced-bass for a keyboard-type device. Acoustic layer 133 includes an audio processing device, such as an audio amplifier with functional controls, two audio transducers (i.e., speakers), an audio enhancement acoustic waveguide structure, and a power source. The audio processor device drives the audio transducers in a well-known manner to generate an audio output that is projected from the front side of the audio transducers and through apertures typically in the top of the keyboard-type device, though such apertures could be located in other positions such as on the front, side or back of any of the keyboard device layers. These "layers" may or may not be independently observable as separate layers from the outside of the device, even though they will typically have internal separations (if not external ones.) According to the subject matter disclosed herein, the audio output that is generated from the back side of each transducer is channeled through an acoustic waveguide structure that is adapted to enhance the bass response of the audio transducers. The output of the acoustic waveguide structure is through a bass output aperture 134. The acoustic waveguide structure provides a richer, fuller-sounding audio output in comparison to the audio output from only the front side of the audio transducers.

Figure 4:
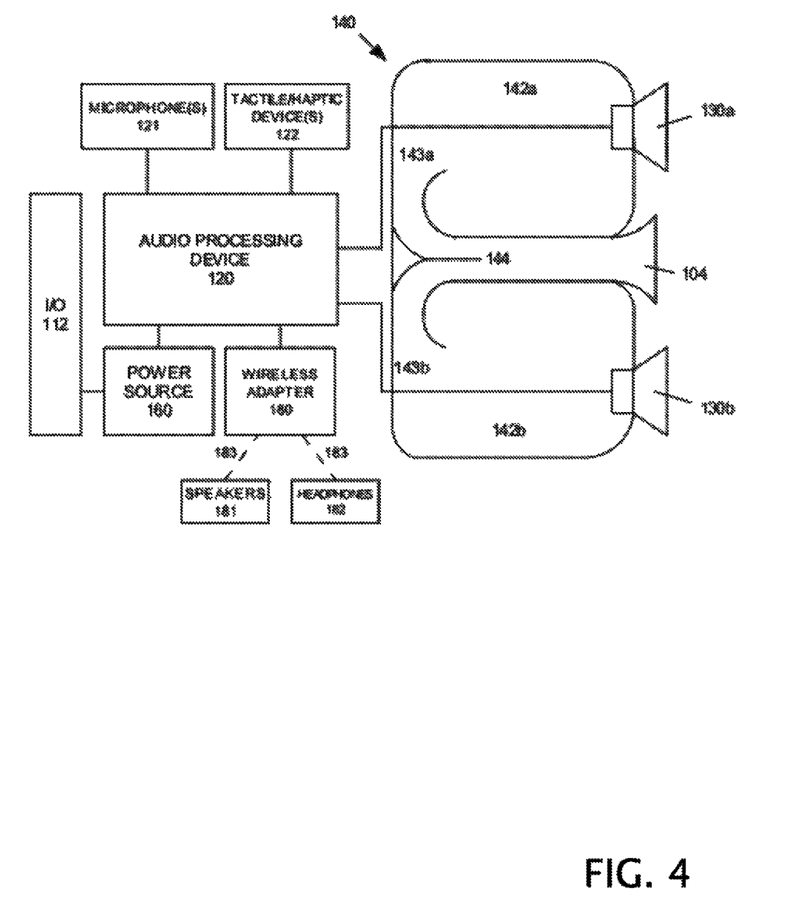
FIG. 4 depicts a functional block diagram of the exemplary embodiment of an acoustic layer according to the subject matter disclosed herein.
Figure 5A:
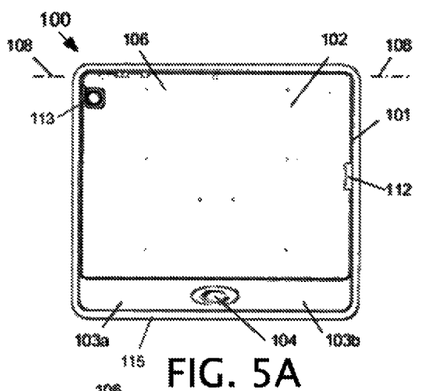
FIGS. 5A-5G respectively depict top, back, left-side, right-side, front, bottom and top perspective views of an exemplary embodiment of an acoustic layer (not shown) according to the subject matter disclosed herein.
Figure 5B:
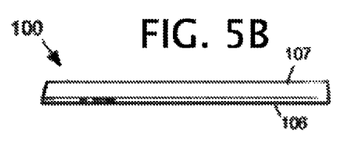
Figure 5C:
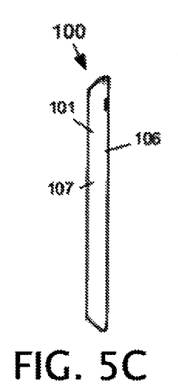
Figure 5D:
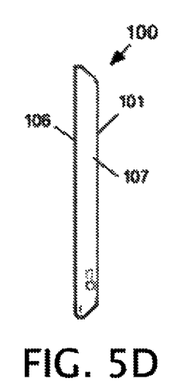
Figure 5E:
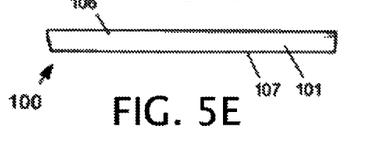
Figure 5F:
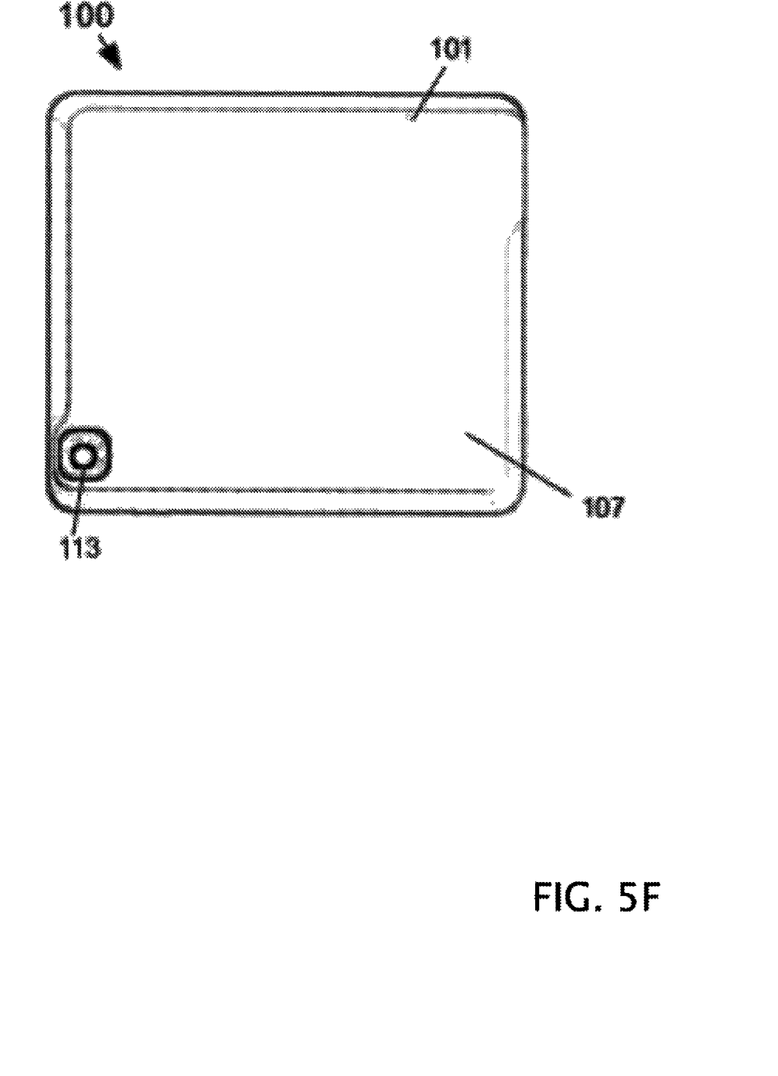
Figure 5G:
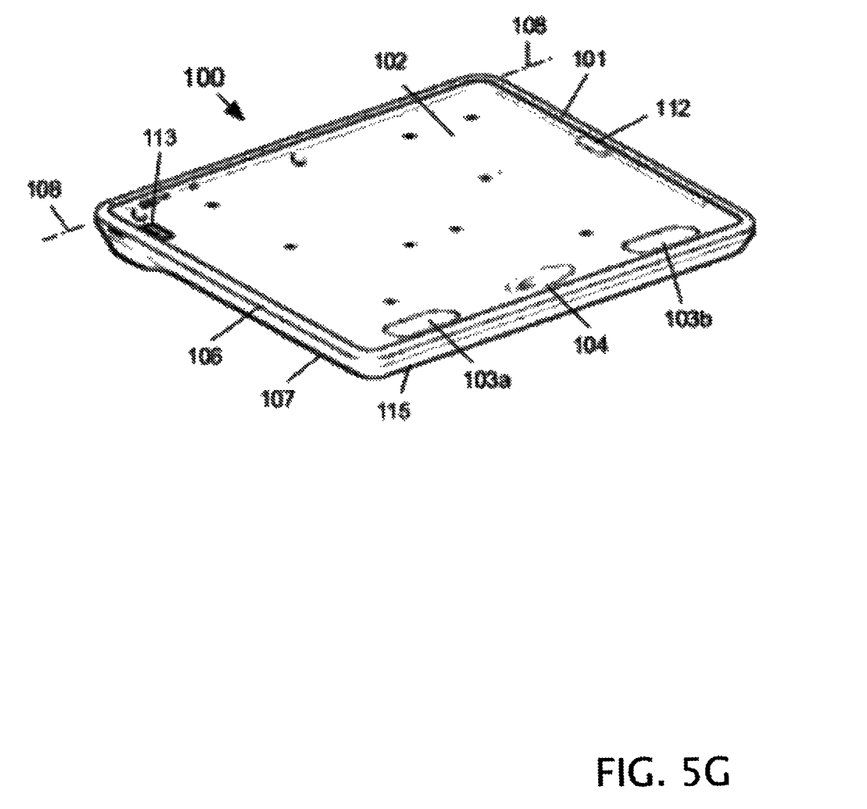
Figure 6A:
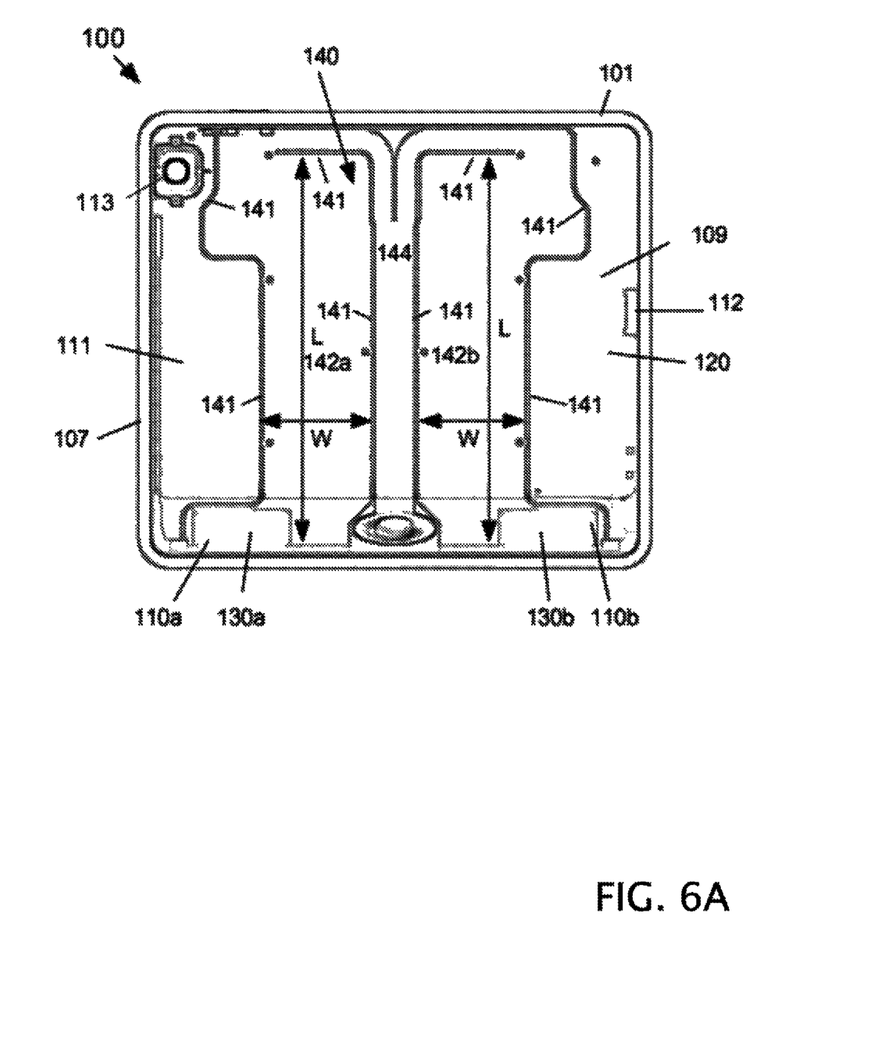
FIGS. 6A and 6B respectively depict an internal top view and an internal top perspective view of the exemplary embodiment of the acoustic layer depicted in FIGS. 1A-1G according to the subject matter disclosed herein.
Figure 6B:
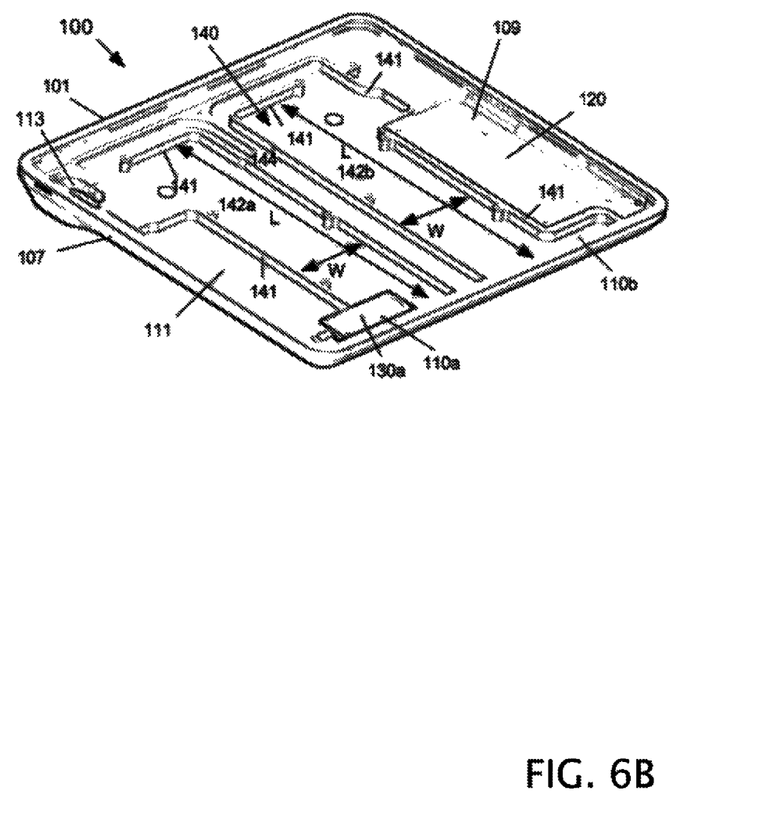

FIGS. 4-6 depict an example of the acoustic layer, or assembly that may be disposed in a keyboard. FIG. 4 is a block diagram of exemplary circuitry and FIGS. 5A-5 GC, and FIGS. 6A-6B show an exemplary housing structure 100, although originally designed for a tablet or pad type device may easily be adapted for use in a keyboard. Although shown as a separate housing, the features described below may easily be integrated into a keyboard housing in equivalent examples. The operation of the acoustic layer is most easily understood by referring to these figures in combination, and discussing the operation of its circuitry in combination with the housing, and in particularly the internal structure of the housing, as its internal structure contributes to the overall sound quality.

Audio signal processing device 120 receives an audio output signal from the keyboard-type device in which it is disposed through, for example, I/O connector 112 and provides audio-signal processing in a well-known manner, such as, but not limited to, amplification, and audio frequency response enhancement and reduction. Audio signal processor device 120 is coupled to and drives audio transducers 130*a*, 130*b* in a well-known manner to generate an audio output that is projected from the front side of transducers 130*a*, 130*b*, and out through apertures 103*a*, 103*b*. The audio output that is generated from the back side of each transducer 130*a*, 130*b* is contained by the acoustic waveguide structure 140 and channeled through aperture 104. Power source 160 is coupled to and provides power to audio processor device 120 in a well-known manner. In one exemplary embodiment, audio processing device 120 is coupled to audio transducer, such as audio speakers 181 and/or headphones 182 through a wireless adapter 180 that provides an optical and/or a radio frequency (RF) link 183, such as, but not limited to, a Bluetooth-type link and/or a WiFi-type link, to audio speakers 181 and/or headphones 182. In another exemplary embodiment, the link between wireless adapter 180 and audio speakers 181 and/or headphones 182 is a bi-directional link. In still another exemplary embodiment, the link between wireless adapter 180 and headphones 182 is an output-directive link in which the output from an acoustic layer is directed to headphones 182. In yet another exemplary embodiment, wireless adaptor 180 provides a bi-directional wireless link between acoustic layer 100 and an external device, such as, but not limited to, a data source and/or an Internet connection. It should also be understood that the spaces for the various functional components depicted is merely exemplary and could be arranged differently and/or to include more or fewer functional components.

In one exemplary embodiment, acoustic waveguide structure 140 comprises walls 141 that are configured to form chambers 142*a*, 142*b*, a waveguide 143*a*, 143*b*, an acoustic waveguide mixing region 144, and an acoustic output channel 145, which is fluidly coupled to bass output aperture 104. Chambers 142*a*, 142*b* are configured so that a length L and a width W of the chamber enhances a bass response of the audio transducers. In one exemplary embodiment, walls 141 are joined to bottom portion 107 so that there is a smooth radius of curvature where wall 141 joins bottom portion 107 in order to minimize air turbulence and provide optimum and efficient audio enhancement. Acoustic waveguide mixing region 144 is configured to couple the respective audio signals from chambers 142*a*, 142*b*.

The various components described herein may be disposed in a housing as shown in FIGS. 5A-5G, 6A and 6B. The internal structure of acoustic layer includes a space or cavity for an audio processing device 120, space or a cavity 110*a*, 110*b* for each of two audio transducers 130*a*, 130*b* (of which only audio transducer 130*a* is shown in FIG. 6B), an audio enhancement acoustic waveguide structure 140, and space 111 for a power source 160, such as a battery. It should be noted that FIG. 5A depicts bass output aperture 104, although the exemplary base output aperture 104 is part of cover 106.

For the purpose of this disclosure, surface 102, may best be considered to be part of the internal boundary between the acoustic layer and the keyboard layer of the keyboard-type device. It is to be noted that the acoustic layer be substantially sealed except for the presence of the acoustic port 134. If a passive radiator is used instead of an acoustic port, then the acoustic layer 133 would likely be completely sealed. If the acoustic layer shares its space with the keyboard layer, then that combined space (acoustic+keyboard layer) would typically need to be substantially sealed to avoid air leaks except for the intentional port 134. Acoustic port 104 is shown to be on the top surface of 102, which would make sense if the acoustic layer were the topmost surface of the keyboard-type device. If the acoustic layer is an inner layer, the acoustic port 104 would more likely exit through one of the side surfaces, such as the front (as depicted as 134 in FIG. 3.) One aspect of this disclosure is the recognition that it is the application of acoustic tuning of the speakers back-wave acoustic space via sealing and waveguide construction that are significant contributions to providing a functioning acoustic layer to the construction of a keyboard-type device. In prior art, keyboards always have essentially accidental treatment of the speakers back-wave acoustic signals, if they included a speaker at all.

FIGS. 5A 5G respectively depict top, back, left-side, right-side, front, bottom and top perspective views of an exemplary embodiment of a device or acoustic layer 100 that may be incorporated in a keyboard type device (133 of FIG. 3) according to the subject matter disclosed herein. Device 100 provides a robust stereo audio output with an enhanced-bass for a pad-type device while also providing a protective cover for the pad-type device. In particular, Device 100 comprises a case or housing 101 that is shown as being adapted to receive a pad-type device (not shown) in a recessed-well region 102 that is formed on the top side of case 100 and best seen in FIG. 5G. Equivalently the housing 101 may be adapted to receive a keyboard as previously described. It should be understood that the shape of recessed-well region 102 could be specifically configured for any particular keyboard. It should also be understood that an exemplary embodiment of the device could be configured so that a keyboard could slide into and be captively held by the device, and/or be placed within the device having a hinged portion of the housing closing over and captively holding the keyboard.

Case 101 encloses an audio processing device, such as an audio amplifier with functional controls, two audio transducers (i.e., speakers), an audio enhancement acoustic waveguide structure, and a power source (not shown). The audio processor device drives the audio transducers in a well-known manner to generate an audio output that is projected from the front side of the audio transducers and through apertures 103*a*, 103*b*. According to the subject matter disclosed herein, the audio output that is generated from the back side of each transducer and is channeled through an acoustic waveguide structure that is adapted to enhance the bass response of the audio transducers. The output of the acoustic waveguide structure is through a bass output aperture 104. The acoustic waveguide structure provides a richer, fuller-sounding audio output in comparison to the audio output from only the front side of the audio transducers.

In one exemplary embodiment, case 101 is formed by a top cover 106 and a bottom cover 107. Top cover 106 is releasably hinged to bottom cover 107 along an axis 108 so that top cover 106 and bottom cover 107 open and close in a clam-shell manner along axis 108, thereby making the internal components of the device (133 of FIG. 3) accessible. The hinging (not shown) is releasable so that top cover 106 can be conveniently separated from bottom cover 107. In another exemplary embodiment, top cover 106 comprises an integral protective cover (not shown) that protects a keyboard when the keyboard is received into recessed-well region 102. In one exemplary embodiment, the protective cover provides a see-through window that permits the keyboard to be seen and provides openings through which the audio output from the device (133 of FIG. 3) can pass. In another exemplary embodiment, the integral protective screen cover is hinged at or near axis 108 and can be rotated from a closed position and positioned at a selected angle with respect to the bottom of the device, thereby permitting a user to tilt the keyboard at a selected angle.

FIGS. 6A and 6B respectively depict an internal top view and an internal top perspective view of the exemplary embodiment of device 100 depicted in FIGS. 5A 5G according to the subject matter disclosed herein. As depicted in FIGS. 6A and 6B, the bottom cover 107 of the device 100 comprises space 109 for an audio processing device 120, space 110a, 110b for each of two audio transducers 130a, 130b (of which only audio transducer 130a is shown in FIG. 6B), an audio enhancement acoustic waveguide structure 140, and space 111 for a power source 160 (not shown in FIG. 6A or 6B), such as a battery. It should be noted that FIG. 6A depicts bass output aperture 104, although base output aperture 104 is part of cover 106.

It should be understood that the exemplary configuration of acoustic waveguide structure 140 and the arrangement of audio processor device 120, transducers 130a, 130b, and power source 160 depicted in FIGS. 6A and 6B is merely one exemplary configuration. Other configurations are possible. In another exemplary embodiment, one or more additional acoustic waveguide structures could be included to enhance selected portions of the audio frequency band.

In one exemplary embodiment, an acoustic layer according to the subject matter disclosed herein comprises a microphone 121 that detects audio signals that are processed by, for example, audio processing device 120. In another exemplary embodiment, an acoustic layer according to the subject matter disclosed herein comprises at least two microphones 121 configured in a spatial-diversity microphone arrangement that passes their respective signals through optional amplifiers (not shown) and then to digitizers that are part of, for example, audio processor device 120. The digitized microphone signals are then digitally signal processed by, for example, a digital signal processor (DSP), to determine and extract speaker-positional information, and/or room acoustical details, such as, but not limited to, room reverberation, room echo, room noise, room acoustical delay and room frequency response, thereby providing a directive sound enhancement and focusable directive sound capture ability. Additionally, the extracted audio information can be used to enhance the intelligibility of an intentionally generated audio signal in a room, such as when an acoustic layer is being used as a speaker phone. That is, an acoustic layer can be configured to provide enhanced speakerphone capability by providing room de-reverberation, noise cancelling, equalization and other possible features, such as, but not limited to, speaker identification, or speaker positional information. In one exemplary embodiment, an acoustic layer may also provide voice-recognition capabilities, thereby allowing transcription and/or voice-activated control of the functional aspects of an acoustic layer, such as, but not limited to volume, equalization, muting or any aspect of the performance of the hardware, firmware or an application running on the personal multimedia electronic device. Generally, digital signal processing can be added to further voice the acoustic layer output sound to change the equalization, spatialization (for example, stereo separation), phase linearization or other acoustic properties of the delivered sound experience.

In one exemplary embodiment, muting effectuated by voice command, referred to herein as "smart-muting," only mutes the audio signal that is ultimately passed along to listener at the other end of a conversation while still being capable of listening for and processing subsequent voice commands, such as, but not limited to, "unmute."

Generally, microphones 121 configured in a spatial-diversity arrangement in conjunction with DSP can be used to improve the intelligibility of any intentionally generated user input or environmentally ambient sound that might be used by an application running on an acoustic layer, the encased personal multi-media electronic device, or combinations thereof. A plurality of microphones configured in a spatial-diversity arrangement can also be used to record sound from the room and/or to calibrate room acoustics, thereby providing information to the DSP making it possible to provide specific equalization for enhancing a listening experience, such as, but not limited to, removing variations in a frequency response of a room and/or linearizing the phase of the acoustic signal delivered to a listener by removing unwanted sounds, such as ambient and/or background noise. In one exemplary embodiment, the spatial-diversity microphone configuration can be configured to provide a monaural modality.

In one exemplary embodiment, a portion of audio processing device 120 provides two-dimensional and/or three-dimensional tactile and/or haptic feedback 122 to a user such as, but not limited to, vibration that could be generated by, for example, one or more piezo-electric devices, electrostatic devices, magneto-static devices, and/or speaker motor or other any other device that creates a physical motion in the case that can be sensed by a user as a vibration, impulse or jerk. The vibration generated by a tactile/haptic portion 122 of audio processing device 120 could also provide haptic abilities for any soft button, hard button, control input, or on-screen touch of any sort, or combinations thereof. The vibration can also be used to enhance a user experience of an application, such as, but not limited to, a video game, movie or audio. Further, vibration can be used to alert a user to any aspect of the operation of either the personal media electronic device and/or an acoustic layer or even in response to some sound that the microphones have picked up either with or without DSP being applied. Vibration can be used in some way as part of an application itself. Examples might include, but are not limited to, message, alarm-clock, or as a stimulus for some sort of measurement or trigger of additional hardware or of the environment. With the inclusion of haptic feedback, it is also possible to change the top surface of the keyboard into a smooth touch surface where the keys and other control interfaces are rendered on a flat touch display instead of being explicit physical keys, knobs or buttons. The haptic feedback would assist the user by providing tactile feedback when keys are touched.

Figure 7:
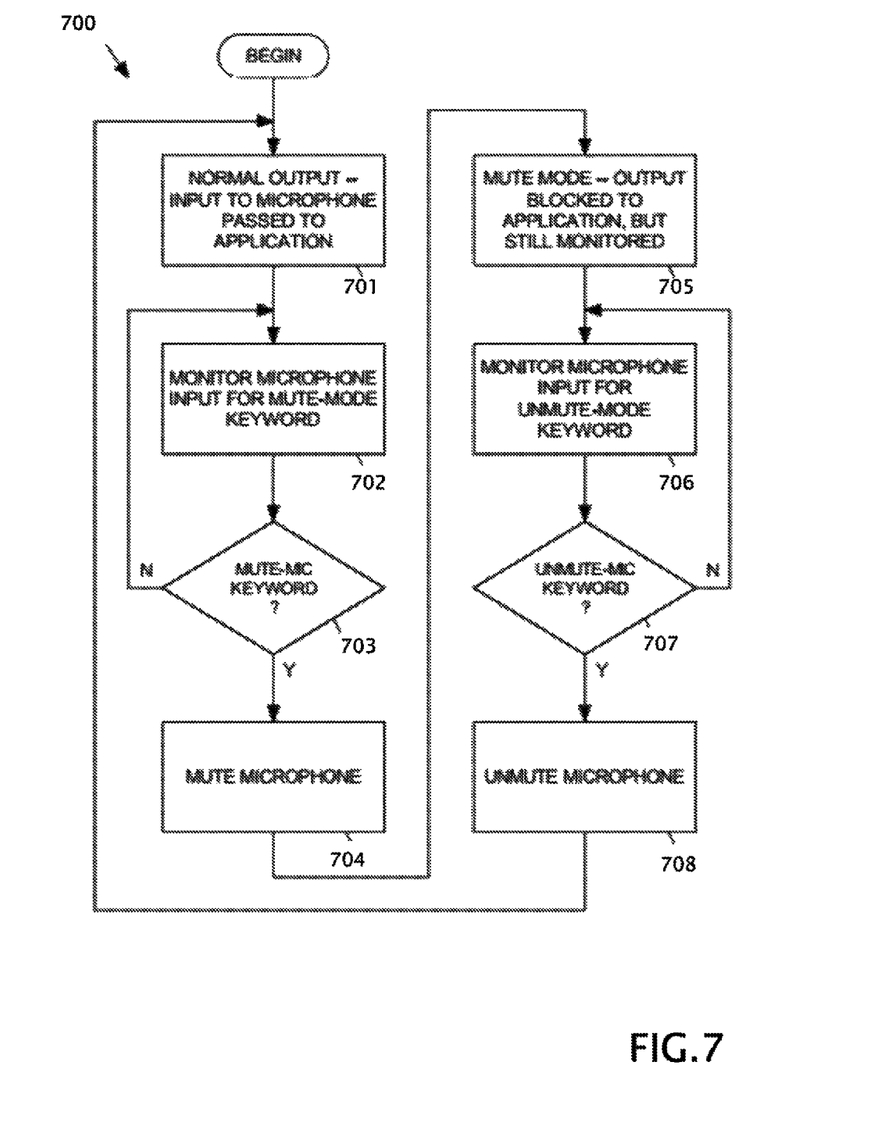
FIG. 7 depicts a flow diagram for one exemplary embodiment of a voice-actuated muting function provided by an acoustic layer according to the subject matter disclosed herein.

FIG. 7 depicts a flow diagram 700 for one exemplary embodiment of a voice-actuated muting function provided by acoustic layer 100. Process flow begins at 701 where the microphone output is in a normal, unmuted mode and is passed to an application. At 702 and 703, the microphone input is monitored for a particular muting keyword that will place an acoustic layer into a mode in which the output of the microphone is muted. If, at 703, it is determined that the muting keyword has been spoken, flow continues to 704 where the microphone output is muted from the application; otherwise, flow returns to 702 for continued monitoring for the particular muting keyword. From 704, flow continues to 705 where the output of the microphone is muted from the application. At 706 and 707, the microphone output is monitored for a particular unmuting keyword that will return an acoustic layer to the normal, unmuted mode. If, at 707, it is determined that the unmuting keyword has been spoken, flow continues to 708 where an acoustic layer returns to the normal, unmuted mode and 701; otherwise, otherwise, flow returns to 706 for continued monitoring for the unmuting keyword.

It will be understood that the present invention is not limited to the method or detail of construction, fabrication, material, application or use described and Illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or Illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

Those skilled in the art will realize that the process sequences described above may be equivalently performed in any order to achieve a desired result. Also, sub-processes may typically be omitted as desired without taking away from the overall functionality of the processes described above.

What is claimed is:

1. A system, comprising:
    a stand-alone keyboard adapted to couple to a pad-type device; and
    a case, the case comprising:
        a recessed holding well configured to receive and captively hold the stand-alone keyboard within the recessed holding well;
        an acoustic waveguide integrated with a bottom cover of the case and between a bottom surface of the case and a bottom surface of the stand-alone keyboard when the stand-alone keyboard is received within the recessed holding well;
        a signal processing device configured to receive a signal from the pad-type device when the stand-alone keyboard is coupled to the pad-type device; and
        at least one audio transducer device coupled to the signal processing device and the acoustic waveguide, the at least one audio transducer device being configured to generate an audible audio output in response to an audio signal output from the signal processing device, the acoustic waveguide being configured to receive the audible audio output and generate an enhanced bass audio output.

2. The system according to claim 1, wherein the keyboard is configured to support the pad-type device in a semi-vertical position.

3. The system according to claim 1, further comprising at least two microphones configured in a spatial-diversity arrangement and coupled to the signal processing device.

4. The system according to claim 3, wherein the signal processing device is configured to receive audio input signals from the at least two microphones and provide a directive sound enhancement of the audio input signals based on a room reverberation, a room echo, a room noise, a room acoustic delay, a room frequency response, speaker-positional information, or a combination thereof, that is determined by the signal processing device.

5. The system according to claim 1, further comprising a tactile device, a haptic device, or a combination thereof, coupled to the signal processing device.

6. The system according to claim 1, further comprising a wireless adaptor coupled to the signal processing device, the wireless adaptor providing a wireless link between a device external to the device.

7. The system according to claim 6, wherein the wireless link is a bi-directional wireless link.

8. The system according to claim 6, wherein the external device is at least one audio speaker, a pair of headphones, or a data source.

9. The system according to claim 1, wherein the case further comprises:
    a first space enclosed by the case for each audio transducer, each first space being configured to receive a corresponding audio transducer, and
    a first aperture for each audio transducer, each first aperture being configured to port the audible audio output from the corresponding audio transducer to a space external to the case when the corresponding audio transducer is received in the first space for the audio transducer,
    wherein the acoustic waveguide is coupled to each first space, the acoustic waveguide being configured to receive the audible audio output from a second side of the corresponding audio transducer when the corresponding audio transducer is received in the first space for the audio transducer, each acoustic waveguide comprising a length and a width that generates an enhanced audio output from the audible audio output from the second side of the corresponding audio transducer when the corresponding audio transducer is received in the first space for the audio transducer, each enhanced audio output having a bass frequency response that is greater than a base frequency response of the audible audio output from a first side of the corresponding audio transducer, the acoustic waveguide further comprising:
    an acoustic waveguide mixing region coupled to each acoustic waveguide, the acoustic waveguide mixing region configured to receive and mix together the enhanced audio output generated from each audio transducer; and
    a second aperture configured to port the mixed-together enhanced audio output to the space external to the keyboard when the corresponding audio transducers are received in the first spaces.

10. The system according to claim 1, wherein the pad-type device is an iPad, an iPhone, a media player, a handheld-computing device, or a handheld multimedia device.

11. The system according to claim 1 further comprising a battery contained within the keyboard.

12. The system according to claim 10, wherein the signal processing device is configured to control a charging of a battery of a pad-type device received by the keyboard.

\* \* \* \* \*